(12) United States Patent
Colbourne et al.

(10) Patent No.: US 7,813,040 B2
(45) Date of Patent: Oct. 12, 2010

(54) MULTI-STAGE OPTICAL ISOLATOR

(75) Inventors: Paul Colbourne, Ottawa (CA); Gonzalo Wills, Ottawa (CA)

(73) Assignee: JDS Uniphase Corporation, Ottawa, Ontario (CA)

( * ) Notice: Subject to any disclaimer, the term of this patent is extended or adjusted under 35 U.S.C. 154(b) by 482 days.

(21) Appl. No.: 11/461,542

(22) Filed: Aug. 1, 2006

(65) Prior Publication Data

US 2007/0291358 A1 Dec. 20, 2007

Related U.S. Application Data

(60) Provisional application No. 60/804,951, filed on Jun. 16, 2006.

(51) Int. Cl.
*G02B 27/28* (2006.01)
(52) U.S. Cl. .......... 359/495; 372/703; 385/11; 398/65
(58) Field of Classification Search ............ None
See application file for complete search history.

(56) References Cited

U.S. PATENT DOCUMENTS

| 5,033,830 A | 7/1991 | Jameson | 359/484 |
| 5,768,005 A | 6/1998 | Cheng et al. | 359/281 |
| 6,055,101 A * | 4/2000 | Bergmann et al. | 359/484 |
| 6,441,961 B1 | 8/2002 | Hou et al. | 359/497 |
| 2003/0058536 A1 | 3/2003 | Huang et al. | 359/495 |
| 2007/0177264 A1* | 8/2007 | Konno et al. | 359/495 |

FOREIGN PATENT DOCUMENTS

| JP | 06059215 A * | 3/1994 |
| WO | WO 2005083495 A1 * | 9/2005 |

OTHER PUBLICATIONS

GB0711507.4 Search Report, UK Patent Office, Oct. 15, 2007.

* cited by examiner

*Primary Examiner*—Arnel Lavarias
(74) *Attorney, Agent, or Firm*—Teitelbaum & MacLean; Neil Teitelbaum; Doug MacLean

(57) ABSTRACT

A double stage isolator is formed of face-to-face slabs or sheets of materials that will suitably split, combine, non-reciprocally rotate to ensure isolation in a reverse direction from output ports to respective input ports of any light launched into the input ports. A right angled Porro-prism is disposed at an end of the affixed together slabs having planar faces to direct light launched in a folded fashion to the output ports. A half waveplate is used in addition to beam splitter combiners and non-reciprocal rotators means that rotate the light by 90 degrees so as to pass a single beam in a forward propagating direction and to interchange the polarization of two sub-beams that pass through from an output port to an input port in a reverse direction.

4 Claims, 5 Drawing Sheets

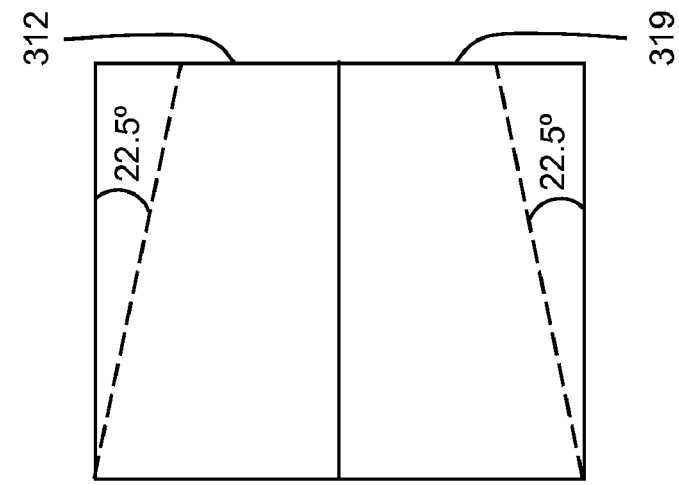
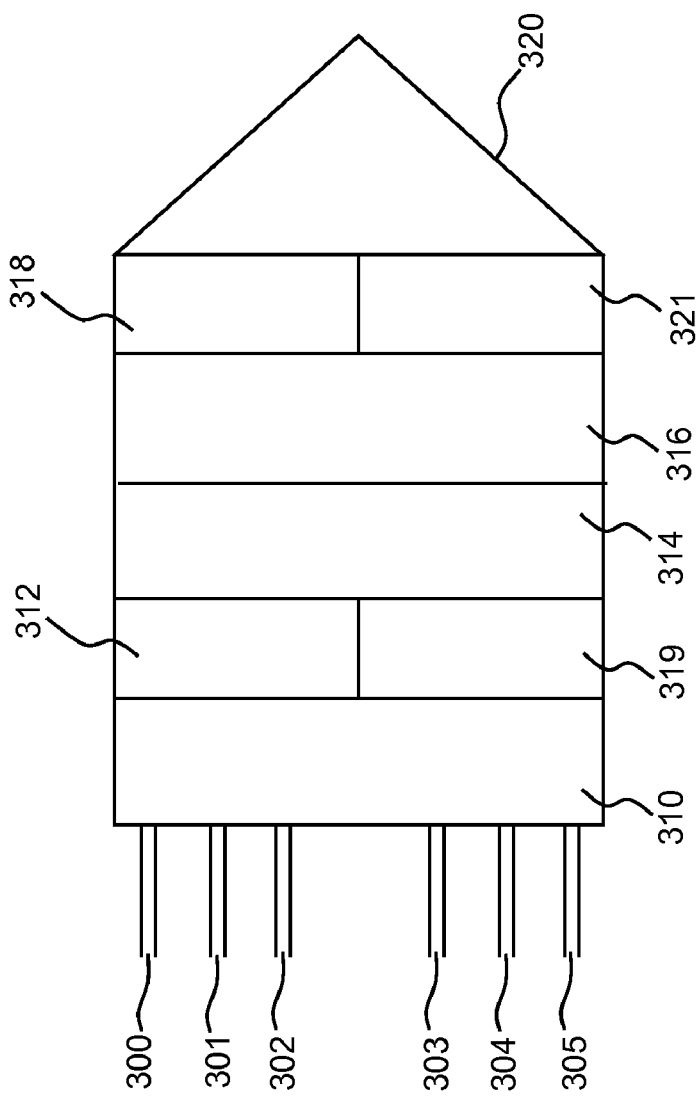
FIG. 3b
FIG. 3a

MULTI-STAGE OPTICAL ISOLATOR

CROSS-REFERENCE TO RELATED APPLICATIONS

The present invention claims priority from U.S. Patent Application No. 60/804,951 filed Jun. 16, 2006, which is incorporated herein by reference for all purposes.

FIELD OF THE INVENTION

This invention relates generally to a multi-stage optical isolator and more particularly to a reflective optical isolating device having at least two stages.

BACKGROUND OF THE INVENTION

Optical isolators are used in a variety of applications in optical communication systems. Generally, optical isolators are used to prevent reflective portions of transmitted signals from re-entering the transmitting device. Many older prior art designs prevent reflections from re-entering a transmitting device in a polarization-selective manner. However, in certain circumstances where a transmission system causes uncontrollable changes in polarization, the polarization state of a signal may be unknown, and thus, this earlier polarization dependent designs are not considered to be practical. Thus, as of late the trend has been to provide optical isolators that are polarization independent.

One prior art polarization independent optical isolator is described in U.S. Pat. No. 5,033,830 issued Jul. 23, 1991 in the name of Jameson and entitled Polarization Independent Optical Isolator. Jameson describes an isolator having a single birefringent plate, a pair of stacked reciprocal rotators, a Faraday rotator, and a reflector positioned in tandem adjacent to the birefringent plate. In a forward (transmitting) direction, an optical signal exiting an optical fiber is split into a pair of orthogonal rays by the birefringent plate. The orthogonal rays then pass through a first reciprocal rotator and the Faraday rotator which provides 22.5° of rotation. The rotated rays are then redirected by the reflector back though the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber. In practice, Jameson's single stage isolator described above, may provide adequate isolation; however, in some instances, increased isolation may be required. Such additional isolation has been known to be provided by using a multi-stage optical isolating device, however known prior art multi-stage devices tend to be bulky and costly to manufacture, often requiring nearly double the number of optical components that a single stage device requires.

As with most electronic and optical devices today, there is an increasing focus on miniaturizing and as well on reducing the cost of manufacturing devices. At times, these objectives are mutually compatible, such that when a device is miniaturized, its cost of manufacture decreases.

In an effort to overcome many known disadvantages of prior art optical isolators U.S. Pat. No. 5,768,005 discloses a relatively compact multi-stage optical isolator wherein a retro-reflector 62 in FIG. 1 of this application, is used to return a beam incident thereon in a backwards direction through the isolating elements to an output port of the optical isolator.

Although the optical isolator described performs its intended function of providing multiple stages of isolation, the structure of the device does not lend itself to a practical way of inexpensive manufacture or assembly. For example due to the presence of the corner cube prism, making a single, bulk, large isolating block and "dicing" it into a plurality of uniform complete optical isolators is not practicable.

Prior art US patent application US2003/0058536 discloses a single stage optical isolator having a right angle prism at an end thereof for folding the beam propagating therethrough, however the isolator does not provide multiple stages of isolation. Furthermore the input ports lie along a line that is offset from a line that the output ports lie along. This is not particularly useful for coupling to planar waveguide light wave circuits (PLCs) where the waveguides lie along a common line.

It has been found to be highly desirable by the inventors of this application to have an isolator that provides at least two stages of isolation, which is compact, and which can be diced into thinner dual stage isolators and wherein the input and output ports lie along a single line. By providing the input and output ports along a single line, such a multi-port two stage isolator can be used at the edge of a PLC to couple to a linear array of waveguides. By so doing, two-stage optical isolation can be "essentially" in-line with and abutting a waveguide chip wherein many ports can achieve optical isolation dependent upon matching the spacing of the ports on the dual stage optical isolator and the waveguides on the chip.

With this in mind, and in view of the known disadvantages and limitations of prior art devices, it is an object of this invention to provide a reflective multi-stage optical isolator that lends itself to large scale manufacturing with little active alignment of components and which has a plurality of input ports and a plurality of output ports aligned along a same line. In a preferred embodiment a two-stage optical isolator is described which overcomes the limitations of the prior art.

This invention has several very significant advantages over the prior art dual stage isolator disclosed in U.S. Pat. No. 5,768,005. Manufacturing a single thick isolator and actively aligning a large right-angle Porro prism at an end thereof, allows subsequent dicing of the large thick isolator into n thin isolators with no further active alignment of the isolating components. This large scale manufacturability saves build-time, minimizes active alignments required; allows sheets of components to be polished and glued together in a single step, rather than having to actively align each isolator.

Therefore, it is an object of this invention to provide a multi-port dual stage optical isolator having ports that lie along a single line that is less costly to manufacture by way of requiring less expensive components and by way of providing a structure that requires many fewer assembly stages in the manufacture of plural isolators.

It is an object to provide a large multi-stage multi-port isolating element which can be manufactured by polishing and bonding or gluing plural components together and then cutting or "dicing" the large element into separate multi-port multistage optical isolators.

It is an object of this invention to provide a method and structure whereby a single active alignment allows a plurality of optical isolators to be aligned, without having to actively align respective components of each isolator.

It is a further object of the invention to provide an embodiment that provides many two-stage optical isolators each having a plurality of ports wherein each isolator is polarization independent and which requires fewer than n active alignments of optical components for n isolators.

SUMMARY OF THE INVENTION

In a very broad aspect of this invention, a multi-stage multi-port optical isolator is provided having a plurality of input ports and a plurality of output ports aligned along a same line, the multi-stage optical isolator having a first isolator and a second isolator, wherein the first isolator is coupled to the second isolator through a Porro prism disposed at an end of the multi-stage optical isolator, the first and second isolators each having means for splitting beams of light passing therethrough into sub-beams in a polarization dependent manner and having means for relatively retarding and rotating light passing therethrough in a polarization dependent manner, said first and second isolators also having means for combining light that has been split into sub-beams, wherein light passing through the Porro prism is received from the first isolator and directed to the second isolator; and wherein the multi-stage optical isolator has means for directing light passing through the multi-port optical isolator such that it couples from the input ports to the output port which lie along the same line.

The multi-stage multi-port optical isolator is essentially a two-stage folded isolator, each stage having an isolator wherein some of the optical elements are shared between the two stages, and wherein the elements are configures to ensure that light to be isolated is directed to output ports along a same line as the input ports.

In accordance with an aspect of this invention a reflective isolator is provided comprising:

a plurality of input and output ports that lie along a same line;

means for separating each collimated beam received at the input ports into two parallel sub-beams with orthogonal polarizations; (Rutile 1)

a nonreciprocal element in which the rotation of the polarization of the sub-beams in the forward and reverse directions differs by 90 degrees; (HWP1, Faraday rotator)

means for recombining the sub-beams; (Rutile 2)

means for interchanging the polarization of the sub-beams, had they not been recombined; (HWP3, for providing isolation on the reverse path)

means for reflecting the beams back toward the input; (right angle prism)

means for separating each collimated beam into two parallel sub-beams with orthogonal polarizations, the means preferably being the same means used above; (Rutile 2)

a nonreciprocal element in which the rotation of the polarization of the sub-beams in the forward and reverse directions differs by 90 degrees; (Faraday rotator, HWP2)

means for recombining the sub-beams, the means preferably being the same means used in above; (Rutile 1)

In addition a microlens array may be provided for collimating incoming beams and for focusing the beams into individual output ports such as waveguides on a same planar light wave circuit (PLC).

In accordance with this invention a non-reciprocal reflective multi-stage isolator is provided comprising: a plurality of input ports; a plurality of output ports; a first polarization beam splitting/combining element for receiving collimated light from an input port and separating the light into two collimated light sub-beams having orthogonal polarizations; a first non-reciprocal element for receiving collimated light in a forward direction and in a reverse direction and rotating the polarizations of said forward transmitted light and said reverse transmitted light so that their polarization directions differ by 90 degrees; a second polarization beam splitting/combining optical element for receiving two collimated light sub-beams with orthogonal polarizations and combining them into a single light beam; a polarization converter element for converting a polarization component of collimated light beam into its orthogonal polarization component; a reflective element for receiving collimated light in a forward direction and reflecting the collimated light in a reverse direction spatially shifted from the forward direction; a third polarization beam splitting/combining element for receiving collimated light and separating the light into two collimated light sub-beams having orthogonal polarizations; a second non-reciprocal element for receiving collimated light in a forward direction and in a reverse direction and rotating the polarizations of said forward transmitted light and said reverse transmitted light so that they differ by 90 degrees; a fourth polarization beam splitting/combining optical element for receiving two collimated light sub-beam with orthogonal polarizations and combining them into a single light beam and coupling the combined light to an output port and wherein:

the plurality of input ports and the plurality of output ports form a linear array in a common plane.

Although separate combining and splitting elements have been defined in the broad aspect of the invention, above, single a single element can be used on the forward going and reverse path whereby the light follows a separate path through the same element along a forward and reverse going path.

In accordance with a different aspect of the invention there is provided a method of manufacturing n discrete optical isolators comprising the steps of:

a) affixing together a plurality of slabs of material for providing a first stage of isolation of beams of light propagating in a forward going direction and for providing a second stage of isolation of said beams in a reverse going direction along a continuous path, opposite to the forward going direction so as to form a block of side-by-side affixed slabs having planar faces "contacting" one another;

b) affixing to the plurality of slabs an optical element that will ensure light passing from the input ports to output ports lies along a same line; and, c) affixing to an end of said block of side-by-side slabs a Porro prism having a planar face parallel to at least one of planar faces of the slabs for redirecting an input beam incident thereon from the forward going direction to the reverse going direction for forming a complete multi-stage isolating block; and, d) cutting along a line orthogonal to the planar faces of the complete multi-stage isolating block, the complete multi-stage isolator into n discrete isolators.

BRIEF DESCRIPTION OF THE DRAWINGS

Exemplary embodiments of this invention will now be described in conjunction with the figures in which:

FIG. 3a is a side view block diagram of a multi-port multi-stage optical isolator having a Porro (right angle) prism at one end.

FIG. 3b is a diagram which illustrates the waveplates and their orientation.

DETAILED DESCRIPTION

Throughout this specification the term polarization rotator is used to denote an element which physically rotates the polarization of a beam propagating therethrough; this is exemplified by a Faraday rotator which is a non-reciprocal rotator; however the term polarization rotator is used hereafter and is found in other prior art patents to denote a waveplate which relatively retards a beam of light passing therethrough with respect to another beam having the effect of being a reciprocal rotating element since the linear polarization state between two beams where only one passes through a waveplate "appears" to be relatively rotated with respect to the other.

Figure 1:
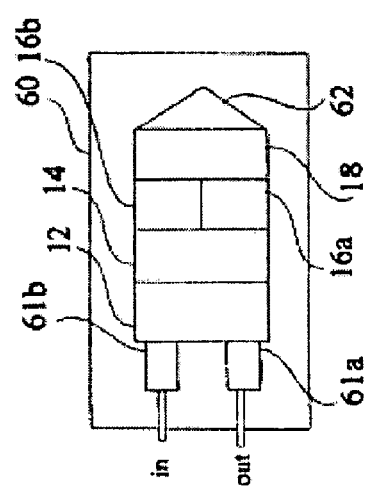
FIG. 1 is a plan view of a prior art polarization independent two-stage reflective optical isolator that includes a corner cube opposite an input/output end for reflecting an input signal backward to an output port for a second stage of isolation.

Turning now to FIG. 1, a prior art double stage isolator is shown. The isolator has a birefringent crystal 12 a Faraday (non-reciprocal) rotator 14, and a birefringent crystal 18 is disposed adjacent waveplates 16a and 16b for combing the two beams of light in the transmitting non-reflecting direction wherein two graded index (GRIN) lenses 61b and 61a are provided at the input/output end of the device for collimating light and focusing light respectively from input optical fiber to the output optical fiber at the input/output end of the device 60. In this embodiment the reflector shown in previous embodiments, has been replaced with a corner cube prism 62 which redirects (via reflection) light launched into the input optical fiber labeled "in" to the output optical fiber labeled "out". One disadvantage of this isolator is that due to the presence of the corner cube retro-reflector, bulk manufacturability of this isolator is not practicable. If one were to replace the corner cube shown in this prior art isolator with a right angle prism without changes to the other components the isolator would not function as an isolator in the reverse direction.

Figure 2:
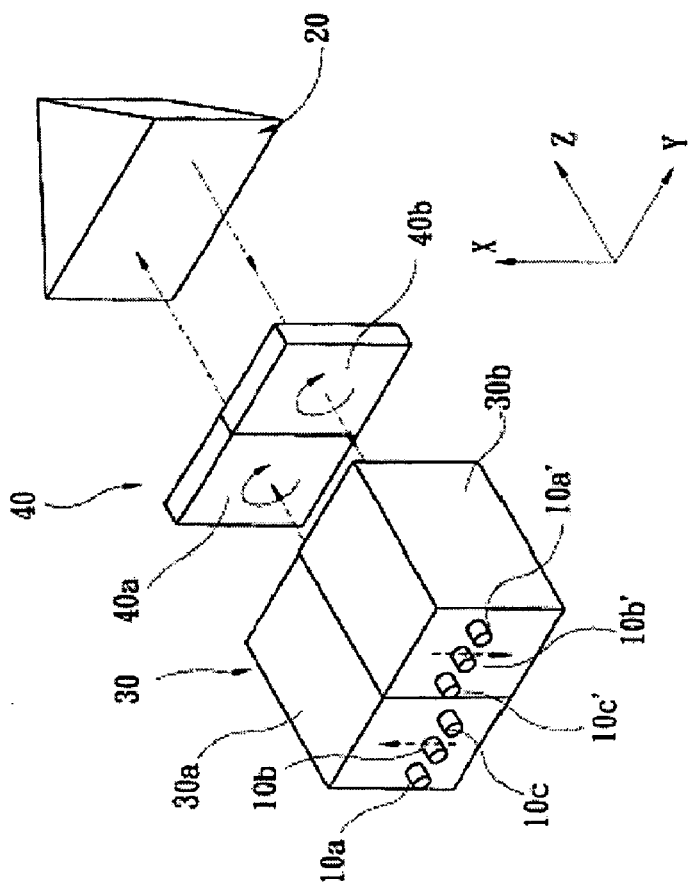
FIG. 2 is a prior art single stage multi-port optical isolator wherein input ports and output ports lie along two different lines.

Referring now to FIG. 2 a prior art single stage isolator is shown, wherein a right angle prism 20 is used to fold back beams to be once isolated to output ports 10a', 10b' and 10c' that share and end face with input ports 10a, 10b, and 10c. As can be seen from this figure the input ports lie along a first line, and the output ports lie along a second line. The polarization splitter/combiner 30 is a birefringent crystal including a left half 30a located in the incident beam path, and a right half 30b located in the return beam path. The direction of the polarization axis of the left half 30a and the right half 30b are opposite to each other. The non-reciprocal polarization rotator 40 is composed of a Faraday crystal 40a located in the incident beam path and a half-wave plate 40b located in the return beam path. The non-reciprocal reflector 20 is a dihedral retro-reflector.

What should be appreciated with regard to this invention, is that simply coupling two optical isolators each having beams splitters and combiners and reciprocal and non-reciprocal rotators therebetween via a right angle prism so as to form a reflective dual stage isolator will not provide an isolator that has input ports and output ports aligned along a same line along with two stages of isolation. Prior art FIG. 1 is absent the required right angle prism this invention requires so as to have a slab manufacturable isolator that can be diced into many thinner isolators. Prior art FIG. 2 does show a right angle prism used to fold the isolator but does not fold it into two isolators. It folds a single stage isolator to make it more compact.

The instant invention provides an arrangement not disclosed in either of the two prior art references whereby an "additional" half waveplate is added which appears to have no predominant effect in the forward going direction as a beam is launched into the isolator and propagates therethrough, but provides the two stages of isolation in the backwards direction. In the absence of this "additional" half waveplate the isolation that is achieved at the output of the first isolator after the beams are combined, is essentially undone by the second stage isolator. More simply stated, light propagating through the entire device shown in FIG. 3a, in the absence of half waveplate 318 would not be isolated with two stages of isolation. This can be understood in conjunction with the following description of FIG. 3a.

In accordance with an embodiment of this invention FIG. 3a is shows a side view of a multi-stage, multi-port, optical isolator wherein a plurality of input waveguides 300, 301 and 302 are coupled to the input end of the isolator and wherein output waveguides 303, 304, and 305 are coupled to the same end for receiving the input beams along a twice isolated path. As can be seen in FIG. 3a, the input waveguides 300, 301 and 302 and the output waveguides 303, 304 and 305 lie along a same line forming a linear array of waveguides. Adjacent the input and output waveguides is micro-lens array of collimating/focusing lenses, not shown. These lenses collimate light received from waveguides 300, 301 and 302 and focus light received from the isolator upon the output waveguides 303, 304, and 305. A first beam splitting/combining rutile crystal 310 receives beams from the micro-lens array and splits light from these beams into sub-beams in a polarization dependent manner. Thus a single beam received from a single micro-lens is separated into a linearly polarized beam of e-rays and an orthogonally linearly polarized beam of o-rays. Since the two beams derived from a single beam are spatially separated they continue propagating however follow different paths in a forward direction toward the end of the isolator having the right angle Porro prism 320. Although there are three beams initially launched into the multi-port isolator, for ease of explanation the path of a single beam launched into the isolator is described. The single input beam that has been separated by the crystal 310 into two sub-beams subsequently passing through a half waveplate 312 next to the crystal 310 and then these two sub-beams are "rotated" such that their state of polarization is shifted by 45 degrees while remaining orthogonally polarized beams even after being rotated. The two sub-beams then pass through a non-reciprocal Faraday rotator 314 and the state of polarization is rotated by another 45 degrees. After passing through the Faraday rotator 314 the sub-beams beams encounter a second beam combiner/splitter 316 and the two sub-beams are once again combined. At this juncture, one could view the circuit thus far defined as having a beam splitter 310, reciprocal rotator 312, non-reciprocal rotator 314, and beam combiner 316 and consider this as a single-stage isolator. Similarly for the elements defined in the parallel path as the light is directed through the prism 320 toward the output port to the same splitter/combiner 316, Faraday rotator 314, a half waveplate 319, and combiner splitter 310. However, these two isolators do not have a cumulative isolating effect to provide a dual stage isolator unless the "additional" half waveplate 318 is provided to "swap" the polarization of the two beams passing therethrough in the backwards direction from the output port to the input port. Without this means for providing 90 degrees rotation or essentially a swapping of the polarizations, o-rays to e-rays and e-rays to o-rays, isolation would not be achieved. The half waveplate has essentially no effect in the forward direction and without consideration of the reverse direction seems to serve no purpose. Notwithstanding, the isolator shown in FIG. 3a would not function as a dual-stage isolator in the absence of this means for swapping the polarizations of the two beams in the backwards direction.

With the inclusion of the half waveplate 318, light that propagates in a reverse direction from where the light exits the crystal 310 following an initial same path backward will not couple into the originating port as it will be substantially redirected away from the originating port.

Figure 4:
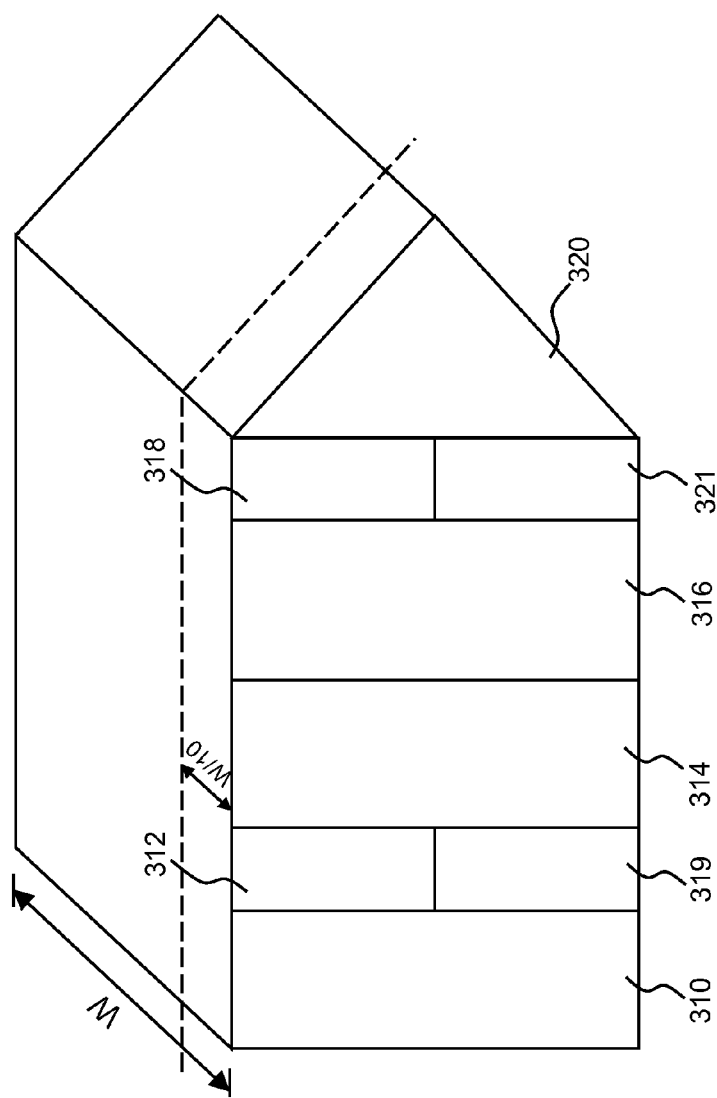
FIG. 4 is a perspective view of the multi-stage optical isolator shown in FIG. 3, having a dashed line indicating a first location where the isolator is diced.

Turning now to FIG. 4 a perspective view of a larger optical isolating device is shown having a width "w". Isolator block as can be seen includes the beam splitter combiner 310, half waveplates 312 and 319, Faraday rotator 314, beam splitter combiner 316, additional half waveplate 318, prism 320, and a spacer 321. In the manufacture of this isolating device, sheets or slabs of planar polished material are adhesively joined to form the larger device. By launching light into ports at an input/output end thereof, the right angle prism 320 can be actively aligned and securely fixed into place with a suitable light transmissive adhesive. In order to manufacture a plurality of optical isolators from device, the block is diced with a dicing saw into, for example 10 isolating chips. A first isolator having a width w/10 results by dicing along the dashed line shown in FIG. 4. By way of example nine additional isolators may be provided by 8 subsequent cuts of the block.

Figure 5:
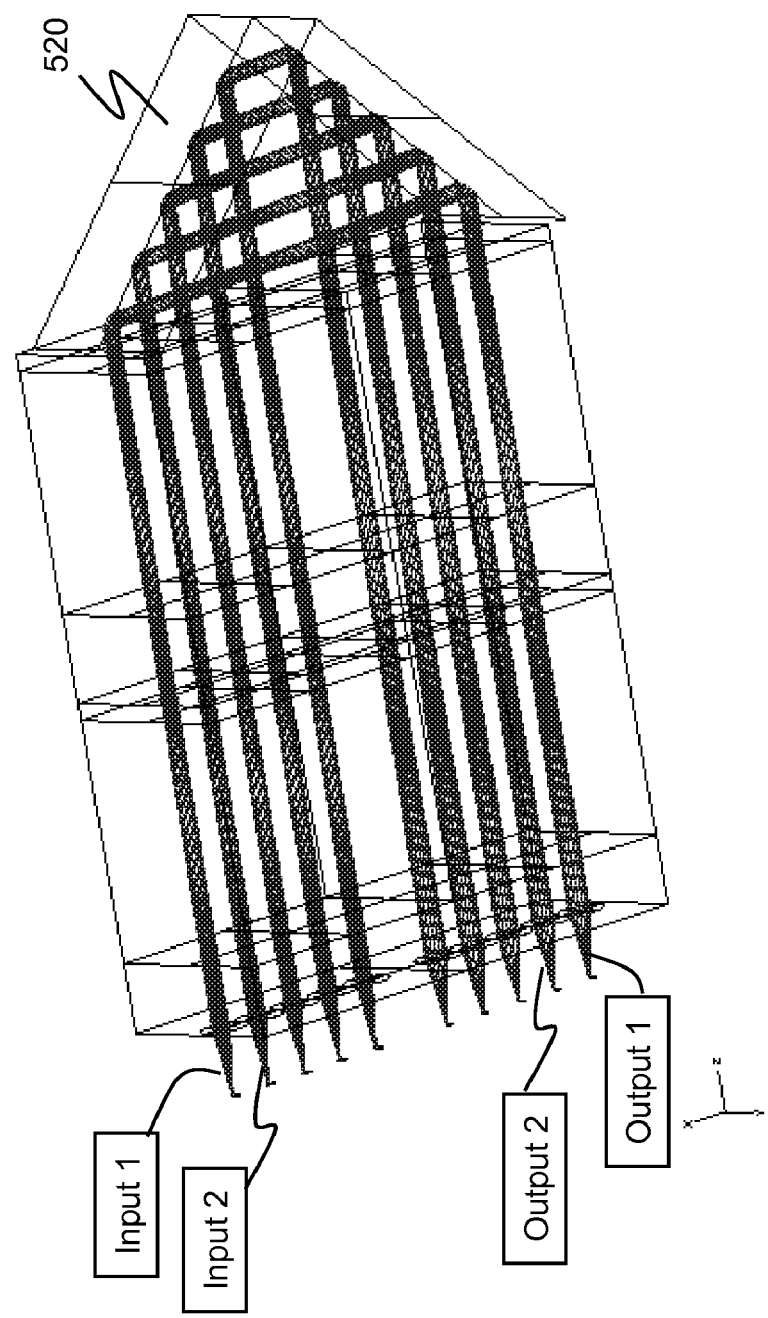
FIG. 5 is a perspective view of a 5-port optical isolator shown light beams traversing the right angled Porro prism.

Referring now to FIG. 5 a 5-port isolator is shown, having 5 input and 5 output ports coupled through a right angle prism 520. This figure illustrates the paths the beams take passing through the prism 520. Noticeably, the 5 paths are substantially separate minimizing the possibility of cross-talk between the beams, for example a small amount of light incident from input 1 reaching output 2 instead of the desired output 1. Replacing the Porro prism with a lens and a mirror would lose this advantage; the multiple beams would overlap at the mirror surface, allowing microscopic defects in the mirror surface to scatter light from one path to another, resulting in increased crosstalk. Furthermore, the possibility is lost of assembling the block and then dicing into individual isolators, unless one were to use a lens array, however fabrication of such large lenses in array form is difficult. Therefore the design of the isolator shown in FIGS. 3 and 4 offers significant advantages over prior art isolators.

Figure 6A:
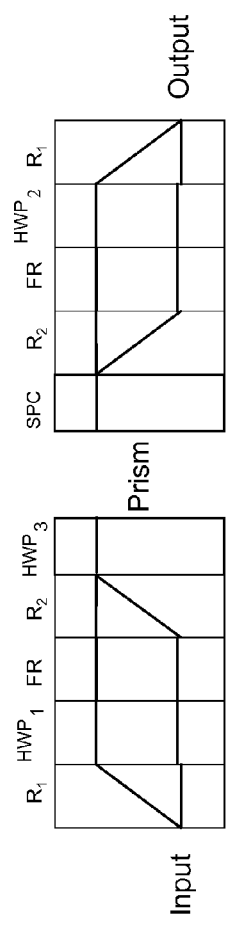
FIG. 6a is a diagram illustrating a single beam as it traverses the isolator splitting and recombining as it traverses the isolator.
Figure 6B:
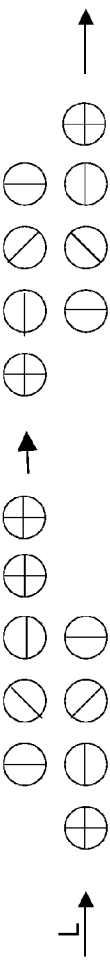
FIGS. 6b and 6c are diagrams showing the state of light at locations along the path followed by the beam shown in FIG. 6a traversing the isolator.

FIG. 6a is a functional block diagram showing a beam of light as it is launched into the optical isolator shown in FIG. 3a from the input end, i.e. one of the input ports, to one of the output ports. The prism 320 is shown as a link between the right and left side of the diagram pictorially illustrating an unfolded path, wherein the path in FIG. 3a is actually folded. By showing the path as unfolded it is easier to conceptualize the beam(s) as it/they propagate therethrough. Note that the view in FIG. 6a is at right angles to the view in FIG. 3a, such that in FIG. 3a the sub-beams would be separated in a direction out of the plane of the page. In FIG. 6b, directly under the unfolded diagram of the device, the polarization states of the light are shown at each interface. In FIG. 6a an input beam is launched into rutile crystal beam splitter/combiner 310 and is separated into two sub-beams which are shown at the interface of 310 and 312 to be orthogonal linearly polarized beams. After passing through half waveplate 312 having an optical axis of 22.5 degrees, the polarization directions are rotated by 45 degrees. The two sub-beams also pass through the Faraday rotator 314 and are non-reciprocally rotated by a further 45 degrees, resulting in a total polarization rotation of 90 degrees. It should be noted that the order of the half waveplate 312 and the Faraday rotator 314 can be reversed. The beams are then combined by the second rutile crystal beam combiner/splitter 316 which mirrors in reverse fashion the first crystal 310. The combined beam then passes though the half waveplate 318, and then passes through the prism 320 and through the glass spacer element 321. The waveplate 318, the prism 320, and the spacer 321 may affect the polarization of the combined beam but this is not relevant to the operation of the isolator in the forward direction. The second beam combiner/splitter 316 separates the beam once again into two sub-beams which are rotated by −45 degrees by the Faraday rotator 314. The rotated orthogonally polarized beams also pass through the half waveplate 319 having and optical axis of −22.5 degrees and are rotated by a further −45 degrees. These two sub-beams are subsequently combined by the rutile crystal 310 and are output on the output port.

Figure 6C:
Figure 6C:
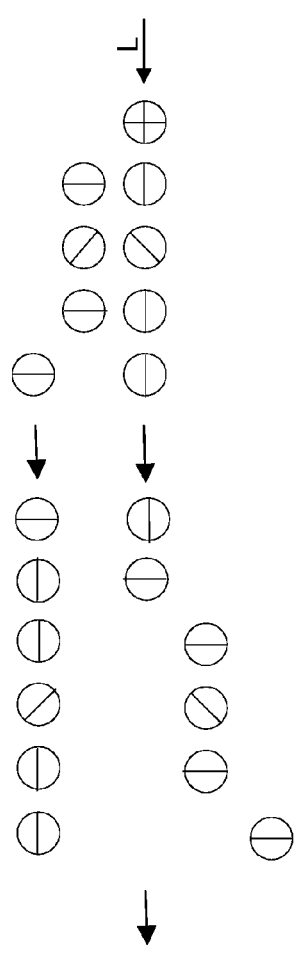

FIG. 6c illustrates the polarization state of light that has been launched into the output end, or that has been reflected backward from the output port to the input port. This shows the actual isolation path. Passing from the right to the left in FIG. 6c, light is shown to be split into two sub-beams by the rutile crystal 310 and rotated as it passed through the half waveplate 319 and Faraday rotator 314. However, in the reverse direction the rotation provided by the Faraday rotator is opposite that in the forward direction, so that the rotation provided by the Faraday rotator cancels that of the half wave plate and there is no net rotation of the polarizations. The rutile crystal 316 then splits the two sub-beams further apart and these widely spaced orthogonally polarized sub-beams pass through the spacer element 321 and the prism 320 unchanged. At this point the function of the half waveplate 318 is made clear. The half waveplate 318 has its optical axis at 45 degrees and rotates the polarization of each sub-beam by 90 degrees. The sub-beams are then further separated by the second pass through the rutile crystal 316. Without half waveplate 318, the sub-beams would have been brought closer together by rutile crystal 316, negating the isolating function of the isolator. On passing through the Faraday rotator 314 and the half waveplate 312, there is again a net polarization rotation of zero in the reverse direction. Rutile crystal 310 then provides still further separation between the sub-beams. The subtlety of this invention is exemplified as the light follows its path through elements 318, 316, 314, 312 and 310. Due to the presence of the half waveplate 318 the polarization of the both beams passing through is rotated by 90 degrees, and is "swapped" s-polarized light becomes p-polarized light and p-polarized light becomes s-polarized light. This has a significant effect as the light traverses the subsequent elements, since the light is strongly diverted from the input port and the required isolation is achieved.

What is claimed is:
1. A multi-stage multi-port optical isolator comprising:
  a plurality of input ports and a plurality of output ports aligned along a same line;
  a first isolating stage and a second isolating stage, wherein the first isolating stage is coupled to the second isolating stage through a Porro prism disposed at an end of the multi-stage multi-port optical isolator, the first and second isolating stages each having:
- a) means for splitting beams of light passing therethrough into sub-beams in a polarization dependent manner
- b) non-reciprocal rotating means for rotating light passing therethrough in a polarization dependent manner, and
- c) means for combining light that has been split into sub-beams, wherein light passing through the Porro prism received from the first isolating stage is directed to the second isolating stage;

and wherein components of the multi-stage multi-port optical isolator are configured to direct light passing through the multi-port optical isolator from the plurality of input ports to the plurality of output ports, wherein the non-reciprocal rotating means in each isolating stage includes a waveplate and a Faraday rotator, wherein one of the first stage and second stage isolators further comprises a second waveplate configured to receive a single beam of light from any of the input ports and wherein the second waveplate is disposed to receive two sub-beams when a single beam of light is launched into any of the output ports, and wherein the second wave plate is disposed and oriented so as to interchange the polarization states of the two sub-beams passing therethrough.

2. A multi-stage multi-port optical isolator as defined in claim 1, wherein the second waveplate is disposed adjacent to the means for splitting light or means for combining light and the Porro-prism.

3. A non-reciprocal reflective multi-stage isolator comprises:
- a plurality of input ports;
- a plurality of output ports;
- a first polarization beam splitting/combining element for receiving collimated light from an input port and separating the light into two collimated light sub-beams having orthogonal polarizations;
- a first non-reciprocal element for receiving collimated light in a forward direction from the input ports toward the output ports and for receiving light in a reverse direction from the output ports to the input ports and for rotating the polarization of forward transmitted light and reverse transmitted light so that their polarization directions differ by 90 degrees;
- a second polarization beam splitting/combining optical element for receiving two collimated light sub-beams with orthogonal polarizations and combining them into a single light beam;
- a polarization converter element for converting a polarization component of collimated light beam into its orthogonal polarization component;
- a Porro-prism for receiving collimated light from the input ports and for reflecting the collimated light toward the output ports;
- a third polarization beam splitting/combining element for receiving collimated light and separating the light into two collimated light sub-beams having orthogonal polarizations;
- a second non-reciprocal element for receiving collimated light in a forward direction from the input ports toward the output ports and for receiving light in a reverse direction from the output ports to the input ports and for rotating the polarization of forward transmitted light and reverse transmitted light so that their polarization directions differ by 90 degrees;
- a fourth polarization beam splitting/combining optical element for receiving two collimated light sub-beam with orthogonal polarizations and combining them into a single light beam and coupling the combined light to an output port and wherein:

the plurality of input ports and the plurality of output ports form a linear array in a common plane.

4. A non-reciprocal reflective multi-stage isolator as defined in claim 3, wherein the first and fourth polarization beam splitting combining elements are a same first crystal, and wherein the second and third polarization beam splitting combining elements are a same second crystal.

* * * * *